(12) United States Patent
McKenna

(10) Patent No.: US 8,021,258 B2
(45) Date of Patent: Sep. 20, 2011

(54) AXLE ASSEMBLY HAVING MECHANISM FOR CIRCULATING LUBRICATING FLUID TO WHEEL ENDS

(75) Inventor: Brian W McKenna, West Bloomfield, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 638 days.

(21) Appl. No.: 12/196,574

(22) Filed: Aug. 22, 2008

(65) Prior Publication Data

US 2010/0048341 A1    Feb. 25, 2010

(51) Int. Cl.
*F16H 57/04*    (2010.01)

(52) U.S. Cl. .......................................... 475/160

(58) Field of Classification Search ............. 475/160
See application file for complete search history.

(56) References Cited

U.S. PATENT DOCUMENTS

| | | | |
|---|---|---|---|
| 4,352,301 A | 10/1982 | Fleury | |
| 5,031,725 A * | 7/1991 | Millar | 184/6.12 |
| 5,316,106 A | 5/1994 | Baedke et al. | |
| 5,540,300 A | 7/1996 | Downs et al. | |
| 5,839,327 A | 11/1998 | Gage | |
| 6,132,329 A * | 10/2000 | Tison | 475/160 |
| 6,135,241 A * | 10/2000 | Ganguly et al. | 184/11.1 |
| 6,502,665 B1 | 1/2003 | Brehob | |
| 6,991,574 B2 | 1/2006 | Martin, III | |
| 7,025,701 B2 | 4/2006 | Cui et al. | |

* cited by examiner

*Primary Examiner* — David D Le
*Assistant Examiner* — Erin D Bishop
(74) *Attorney, Agent, or Firm* — Harness, Dickey & Pierce, P.L.C.

(57) ABSTRACT

An axle assembly with an axle shaft, an annular disc and a pair of change members. The axle shaft includes an unthreaded body portion having a first diameter. The annular disc is mounted on the body portion and has a central aperture through which the unthreaded body portion is received. The central aperture has a second diameter that is larger than the first diameter. Rotation of the axle shaft causes the annular disc to translate on the unthreaded body portion between the change members and wherein a direction in which the annular disc translates is changed through contact between the annular disc and the change members.

21 Claims, 4 Drawing Sheets

AXLE ASSEMBLY HAVING MECHANISM FOR CIRCULATING LUBRICATING FLUID TO WHEEL ENDS

INTRODUCTION

The present invention generally relates to an axle assembly having a mechanism for circulating a lubricating fluid to the wheel ends of the axle assembly.

It is known in the art that the temperature of a lubricating fluid within an automotive axle assembly increases during operation of the axle assembly. In instances of extremely high loading, the increased temperature can reduce the viscosity of the lubricating fluid. Such reduction in viscosity can lead to increased friction and wear, thereby further increasing the temperature of the lubricating fluid and further reducing its viscosity.

It is also known that lubrication of the bearings and seals at the wheel end of the axle tubes in an automotive axle assembly are provided with lubrication through movement of the oil from a sump in the differential case to the wheel ends when the automobile performs a turning activity. Where vehicle are operated in areas having long, straight roads requiring relatively little turning activity, it may be desirable to provide some means for circulating oil to the wheel ends of the axle tubes.

Several solutions have been proposed for cooling the lubricating fluid in an axle assembly. Some proposed solutions include pumps and separate heat exchangers. Such proposed solutions tend to be complex and expensive and can be difficult to package into a vehicle. U.S. Pat. No. 6,132,329 discloses an axle assembly in which the axle shafts have helical protrusions. The '329 patent describes the helical protrusions as being capable of moving a lubricating fluid from an area proximate a differential assembly to a side of the axle assembly opposite the differential assembly. Such helical protrusions significantly increase the cost of the axle shafts.

In view of the above remarks, there remains a need in the art for an axle assembly with a relatively simple and low cost means for circulating a lubricating fluid to the wheel ends of the axle assembly.

SUMMARY

This section provides a general summary of some aspects of the present disclosure and is not a comprehensive listing or detailing of either the full scope of the disclosure or all of the features described therein.

In one form, the present teachings provide an axle assembly that includes an axle housing, a differential assembly, an axle shaft, an annular disc and a pair of change members. The axle housing has a carrier housing portion and an axle shaft housing portion. The axle shaft housing portion includes a shaft passage that is arranged about a longitudinal passage axis. The differential assembly is supported in the carrier housing for rotation about a rotational axis that is coincident with the longitudinal passage axis. The axle shaft is received in the axle shaft housing portion and coupled to the differential assembly. The axle shaft includes an unthreaded body portion had a first diameter. The annular disc is mounted on the axle shaft and has a central aperture through which the cylindrical body portion is received. The central aperture has a second diameter that is larger than the first diameter. The change members are disposed in the shaft passage and are axially spaced-apart along the longitudinal passage axis. Rotation of the axle shaft causes the annular disc to translate on the unthreaded body portion between the change members and a direction in which the annular disc translates is changed through contact between the annular disc and the change members.

Further areas of applicability will become apparent from the description provided herein. It should be understood that the description and specific examples in this summary are intended for purposes of illustration only and are not intended to limit the scope of the present disclosure, its application and/or uses in any way.

BRIEF DESCRIPTION OF THE DRAWINGS

The drawings described herein are for illustrative purposes only and are not intended to limit the scope of the present disclosure in any way. The drawings are illustrative of selected teachings of the present disclosure and do not illustrate all possible implementations. Similar or identical elements are given consistent identifying numerals throughout the various figures.

DETAILED DESCRIPTION OF THE VARIOUS EMBODIMENTS

Figure 1:
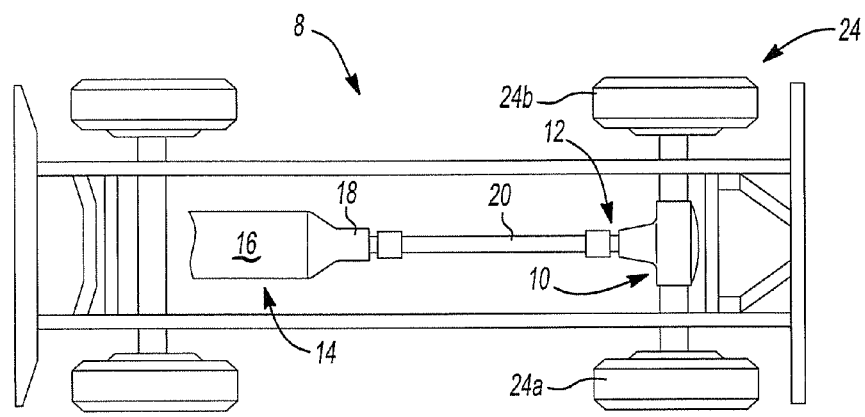
FIG. 1 is a schematic illustration of a vehicle having an axle assembly constructed in accordance with the teachings of the present disclosure.

With reference to FIG. 1 of the drawings, a vehicle 8 having an axle assembly 10 constructed in accordance with the teachings of the present disclosure is illustrated. The vehicle 8 can include a driveline 12 that is drivable via a connection to a power train 14. The power train 14 can include an engine 16 and a transmission 18. The driveline 12 can include a propshaft 20, the axle assembly 10 and a plurality of wheels 24. The engine 16 can be mounted in an in-line or longitudinal orientation along the axis of the vehicle 8 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the axle assembly 10 where it can be selectively apportioned in a predetermined manner to the left and right rear wheels 24a and 24b, respectively.

Figure 2:
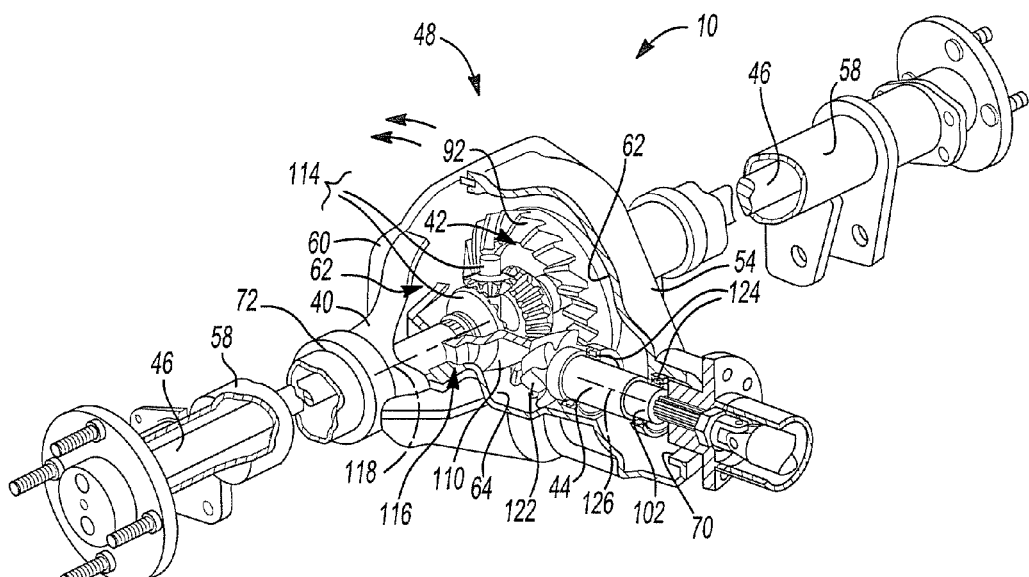
FIG. 2 is a perspective, partially broken away view of the axle assembly of FIG. 1.
Figure 3:
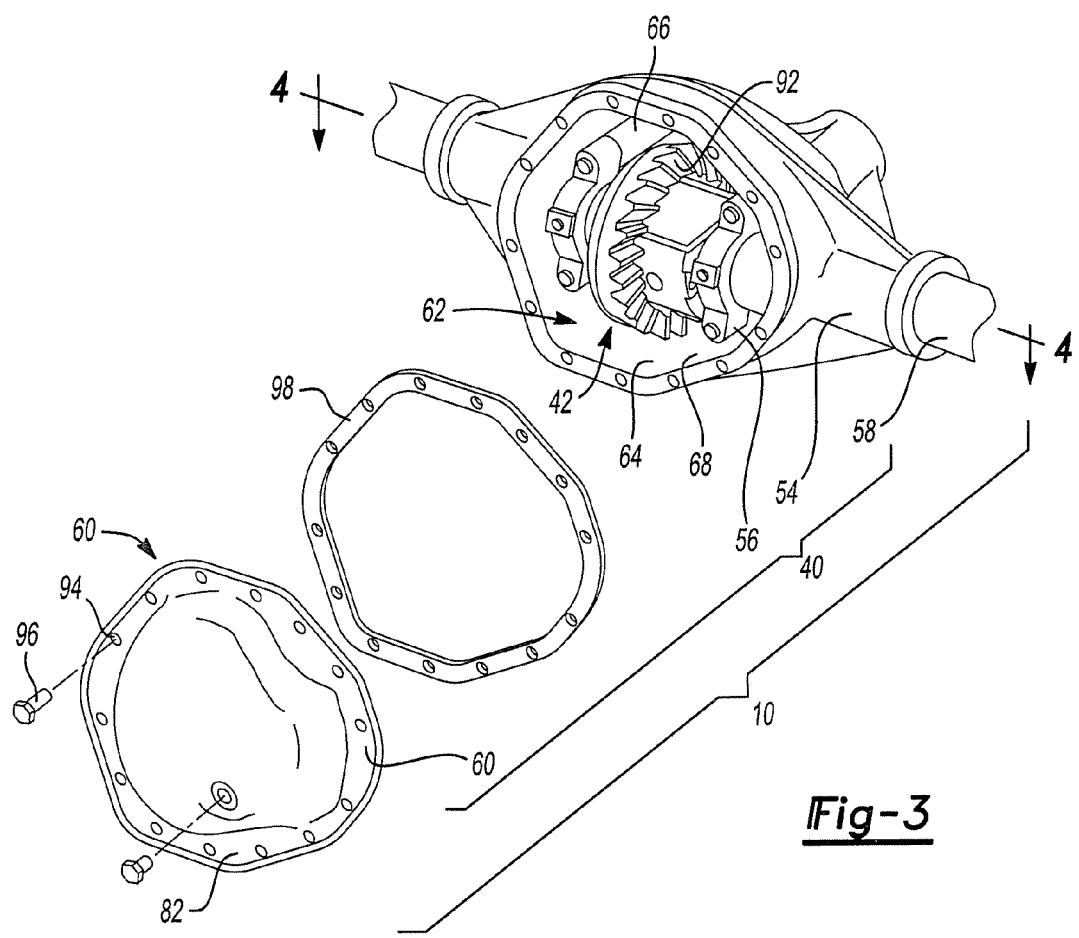
FIG. 3 is an exploded perspective view of a portion of the axle assembly of FIG. 1.

With reference to FIGS. 2 and 3, the axle assembly 10 can include an axle housing assembly 40, a differential assembly 42, an input pinion assembly 44, and a pair of axle shafts 46.

In the particular example provided, the axle housing assembly 40 includes a carrier housing 54, a pair of bearing caps 56, a pair of axle shaft housing portions (e.g., axle tubes) 58 and a cover 60. The axle housing 40 can define an internal cavity 62 that forms a fluid sump 64 in which a liquid lubricant (for lubricating the differential assembly 42 and input pinion assembly 44) is located. The carrier housing 54 can include a pair of bearing journals 66, a differential aperture 68, which can be disposed on a first side of the carrier housing 54, a pinion aperture 70, which can be disposed on a second side of the carrier housing 54 opposite the differential aperture 68, and a pair of axle tube apertures 72 that can intersect the opposite lateral sides of the internal cavity 62. The bearing caps 56 can be removably coupled to the bearing journals 66. The axle tubes 58 can be received in the axle tube apertures 72 and can be fixedly coupled to the carrier housing 54. The cover 60 can include a flange portion 82 having a plurality of through holes 94. Threaded fasteners 96 can be received through the through holes 94 and threadably engaged to corresponding threaded holes in the carrier housing 54 to fixedly but removably couple the cover 60 to the carrier housing 54. A gasket 98 can be received between the cover 60 and the carrier housing 54 to seal the interface between the cover 60 and the carrier housing 54.

The differential assembly 42 can be any appropriate vehicle differential and can conventionally include a case 110, the ring gear 92, which can be rotatably coupled to the case 110, and a gearset 114 that can be housed in the case 110. The differential assembly 42 can be received into the internal cavity 62 through the differential aperture 68. The bearing journals 66, the bearing caps 56 and a pair of bearings 116 can cooperate to support the differential assembly 42 for rotation in the internal cavity 62 about a first rotational axis 118.

The input pinion assembly 44 can conventionally include an input shaft 120 and an input pinion 122 that can be coupled for rotation with the input shaft 120. The input pinion assembly 44 can be received into the carrier housing 54 through the pinion aperture 70 such that the input pinion 122 is meshingly engaged to the ring gear 92. A pair of bearings 124 can be coupled to the carrier housing 54 and the input shaft 120 and can support the input pinion assembly 44 for rotation about a second rotational axis 126 that can be generally perpendicular to the first rotational axis 118. An end of the input shaft 120 opposite the input pinion 122 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 128 in the gearset 114 of the differential assembly 42. Accordingly, it will be appreciated that rotary power input to the axle assembly 10 via the input pinion assembly 44 is transmitted through the ring gear 92, to the case 110 and the gearset 114 and output to the axle shafts 46 to provide propulsive power to the left and right rear wheels 24a and 24b (FIG. 1).

Figure 4:
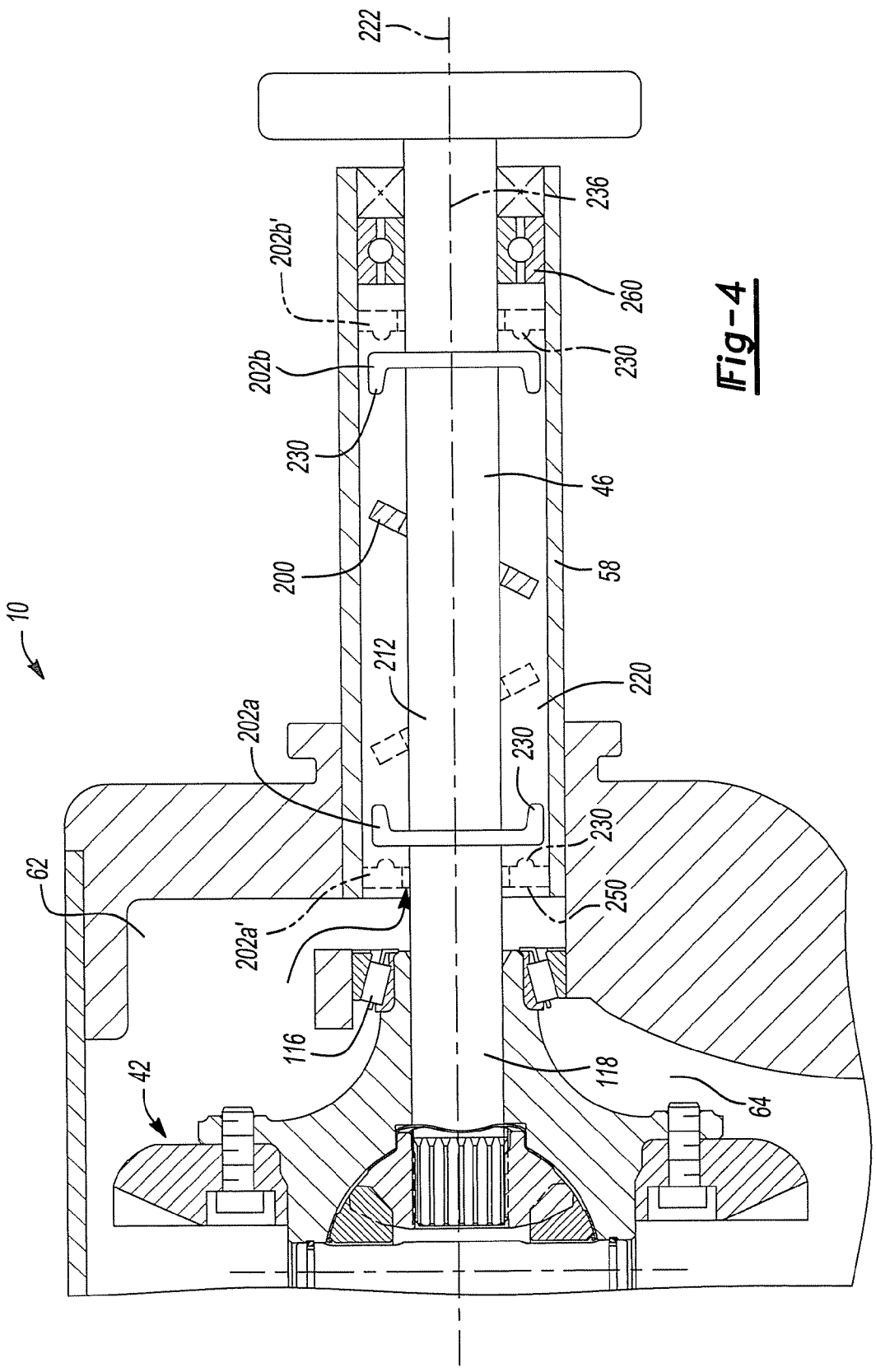
FIG. 4 is a longitudinal section view of a portion of the axle assembly of FIG. 1.
Figure 5:
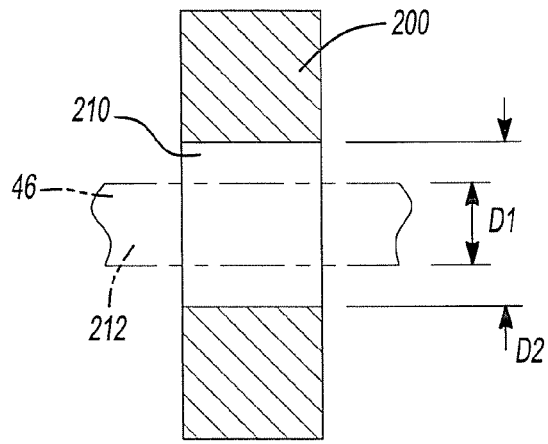
FIG. 5 is a section view of a portion of the axle assembly of FIG. 1, illustrating the annular member in more detail.
Figure 6:
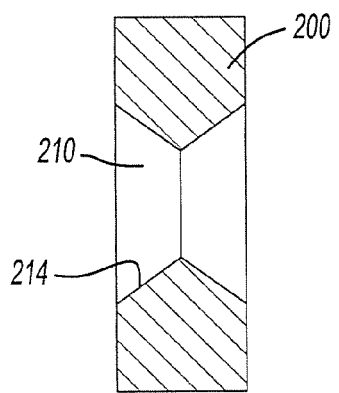
FIGS. 6 and 7 are section views similar to that of FIG. 5 but illustrating the annular member with a central aperture having different contoured surfaces.
Figure 7:
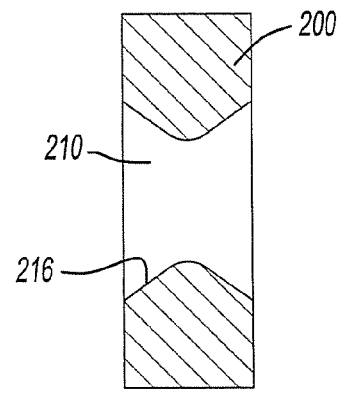

With reference to FIG. 4, a portion of the axle assembly 10 is illustrated in more detail. The axle assembly 10 can further include an annular disc 200 and a pair of change members 202a, 202b. With additional reference to FIG. 5, the annular disc 200 can be a washer-like structure having a central aperture 210 through which a body portion 212 of the axle shaft 46 can be received. The body portion 212 of the axle shaft 46 can be unthreaded and generally cylindrical in shape with a first diameter D1 that can be relatively smaller than a diameter (i.e., a second diameter D2) of the central aperture 210. Alternatively, the central aperture 212 can have a contoured surface, such as a contoured surface that is defined by a chamfer 214, as shown in FIG. 6 or a contoured surface that is defined by a radius 216 as shown in FIG. 7.

Returning to FIG. 4, each of the change members 202a, 202b can be received into a shaft passage 220 that is formed in the axle tube 46. The change members 202a, 202b can be spaced axially apart from one another along a longitudinal passage axis 222 of the shaft passage 220. The change members 202a, 202b could be coupled for rotation with the body portion 212 of the axle shaft 46. In the alternative, the change members could be fixedly mounted to the axle tube 46. The change members for this alternative arrangement are shown in phantom line and designated by reference numerals 202a' and 202b'. Each of the change members 202a, 202b includes a lip or protrusion 230 that extends toward the other one of the change members 202a, 202b.

Figure 8:
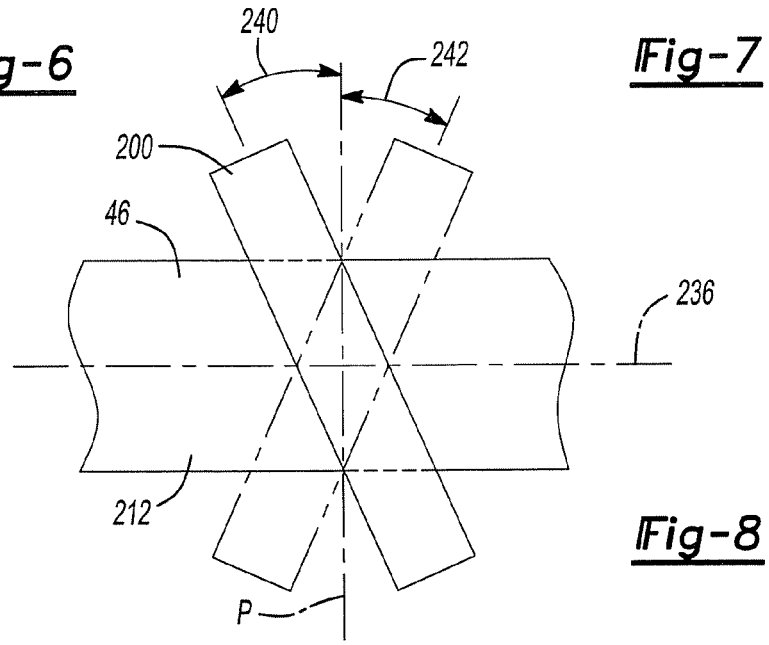
FIG. 8 is a side elevation view of a portion of the axle assembly of FIG. 1, illustrating the annular member and the axle shaft in more detail.

It will be appreciated that as the central aperture 210 (FIG. 5) in the annular member 200 is larger than body portion 212 of the axle shaft 46, the annular member 200 can rest on the body portion 212 in a position that is generally transverse to the longitudinal axis 236 of the axle shaft 46. In this regard, the annular member 200 can pivot on the axle shaft 46 between a first position, which is shown in solid line in FIG. 8, and a second position that is shown in phantom line in FIG. 8. When positioned in the first position, the annular member 200 can be disposed at a first angle 240 relative to an imaginary plane P that extends perpendicular to a longitudinal axis 236 of the axle shaft 46. When positioned in the second position, the annular member 200 can be disposed at a second angle relative to the imaginary plane P. The first and second angles 240 and 242 can extend from opposite sides of the plane P. The first and second angles 240 and 242 can be equal in magnitude.

Returning to FIG. 4, a portion of the differential assembly 42 can rotate through a lubricating fluid that is disposed in the fluid sump 64 during operation of the axle assembly 10. Lubricant that clings to the differential assembly 42 can be slung radially outwardly and a portion of the slug lubricant can be directed (e.g., via the geometry of the internal cavity 64) into a first end 250 of the shaft passage 220 that is located proximate the differential assembly 42. Accordingly, lubricant entering the shaft passage 220 can partially fill the shaft passage 220 with lubricant. Rotation of the axle shaft 46 can cause the annular member 200 to translate on the body portion 212 of the axle shaft 46 toward one of the change members 202a, 202b (e.g., toward change member 202b). As the annular member 200 extends into the lubricant in the shaft passage 220, movement of the annular member 200 toward the change member 202b can push lubricant in a direction away from the differential assembly 42 to an area of the axle tube 58 that is relatively cooler. Contact between the annular member 200 and the lip 230 of the change member 202b can cause the annular member 200 to pivot on the body portion 212 from the first position to the second position. Orientation of the annular member 200 in the second position can cause the annular member 200 to translate toward the change member 202a as the axle shaft 46 rotates, thereby causing the annular member 200 to push the lubricant in the shaft passage 220 outwardly toward the differential assembly 42. Contact between the annular member 200 and the lip 230 of the change member 202a can cause the annular member 200 to pivot on the body portion 212 from the second position to the first position.

In view of the above discussion, it will be appreciated that the annular member 200 can translate in the shaft passage 220 between the change members 202a, 202b to cyclically push lubricant in the shaft passage 220 away from the differential assembly 42 and then toward the differential assembly 42. Such cyclic movement of the lubricant in the shaft passage 220 is believed to aid in the cooling of the lubricant in the axle assembly 10, as well as to aid in the lubrication of an outboard bearing 260 that supports the axle shaft 46 on a side opposite the differential assembly 42.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
   an axle housing having a carrier housing portion and an axle shaft housing portion, the axle shaft housing portion including a shaft passage that is arranged about a longitudinal passage axis;
   a differential assembly supported in the carrier housing for rotation about a rotational axis that is coincident with the longitudinal passage axis;
   an axle shaft received in the axle shaft housing portion and coupled to the differential assembly, the axle shaft including a cylindrical body portion having a first diameter;
   an annular disc mounted on the axle shaft and having a central aperture through which the cylindrical body portion is received, the central aperture having a second diameter that is larger than the first diameter; and
   a pair of change members in the shaft passage, the change members being axially spaced-apart along the longitudinal passage axis;
   wherein the annular disc is pivotable on the body portion between a first position, in which the annular disc is disposed at a first angle relative to a plane that extends perpendicular to the longitudinal passage axis, and a second position, in which the annular disc is disposed at a second angle relative to the plane that extends perpendicular to the longitudinal passage axis, the first and second angles extending from opposite sides of the plane; and
   wherein contact between the change members and the annular disc while the axle shaft rotates causes the annular disc to move between the first and second positions.

2. The axle assembly of claim 1, wherein the first and second angles are equal in magnitude.

3. The axle assembly of claim 1, wherein the axle shaft housing portion includes an axle tube and wherein the change members are discrete structures that are coupled to the axle tube.

4. The axle assembly of claim 1, wherein the carrier housing portion includes a carrier housing and a pair of bearing caps, wherein the carrier housing defines a differential cavity, and wherein the differential assembly includes a differential case and a pair of bearings, the bearings being received between the carrier housing and the bearing caps and supporting the differential case for rotation in the carrier housing.

5. The axle assembly of claim 4, wherein the differential cavity extends between one of the bearing caps and the axle shaft housing portion.

6. The axle assembly of claim 4, wherein the change members are located outboard of the bearings.

7. The axle assembly of claim 1, wherein the central aperture is a cylindrical hole.

8. The axle assembly of claim 1, wherein the central aperture is defined by a contoured surface.

9. The axle assembly of claim 8, wherein at least a portion of the contoured surface is defined by a radius.

10. The axle assembly of claim 8, wherein at least a portion of the contoured surface is defined by a chamfer.

11. The axle assembly of claim 1, wherein the change members are coupled to the axle shaft for rotation therewith.

12. An axle assembly comprising:
    an axle housing having a carrier housing portion and an axle shaft housing portion, the axle shaft housing portion including a shaft passage that is arranged about a longitudinal passage axis;
    a differential assembly supported in the carrier housing for rotation about a rotational axis that is coincident with the longitudinal passage axis;
    an axle shaft received in the axle shaft housing portion and coupled to the differential assembly, the axle shaft including an unthreaded body portion having a first diameter;
    an annular disc mounted on the axle shaft and having a central aperture through which the unthreaded body portion is received, the central aperture having a second diameter that is larger than the first diameter; and
    a pair of change members in the shaft passage, the change members being axially spaced-apart along the longitudinal passage axis;
    wherein rotation of the axle shaft causes the annular disc to translate on the unthreaded body portion between the change members and wherein a direction in which the annular disc translates is changed through contact between the annular disc and the change members.

13. The axle assembly of claim 12, wherein the axle shaft housing portion includes an axle tube and wherein the change members are discrete structures that are coupled to the axle tube.

14. The axle assembly of claim 12, wherein the carrier housing portion includes a carrier housing and a pair of bearing caps, wherein the carrier housing defines a differential cavity, and wherein the differential assembly includes a differential case and a pair of bearings, the bearings being received between the carrier housing and the bearing caps and supporting the differential case for rotation in the carrier housing.

15. The axle assembly of claim 14, wherein the differential cavity extends between one of the bearing caps and the axle shaft housing portion.

16. The axle assembly of claim 14, wherein the change members are located outboard of the bearings.

17. The axle assembly of claim 12, wherein the central aperture is a cylindrical hole.

18. The axle assembly of claim 12, wherein the central aperture is defined by a contoured surface.

19. The axle assembly of claim 18, wherein at least a portion of the contoured surface is defined by a radius.

20. The axle assembly of claim 18, wherein at least a portion of the contoured surface is defined by a chamfer.

21. The axle assembly of claim 12, wherein the change members are coupled to the axle shaft for rotation therewith.

* * * * *